R. KROEDEL.
CAMERA BACK.
APPLICATION FILED APR. 24, 1908.

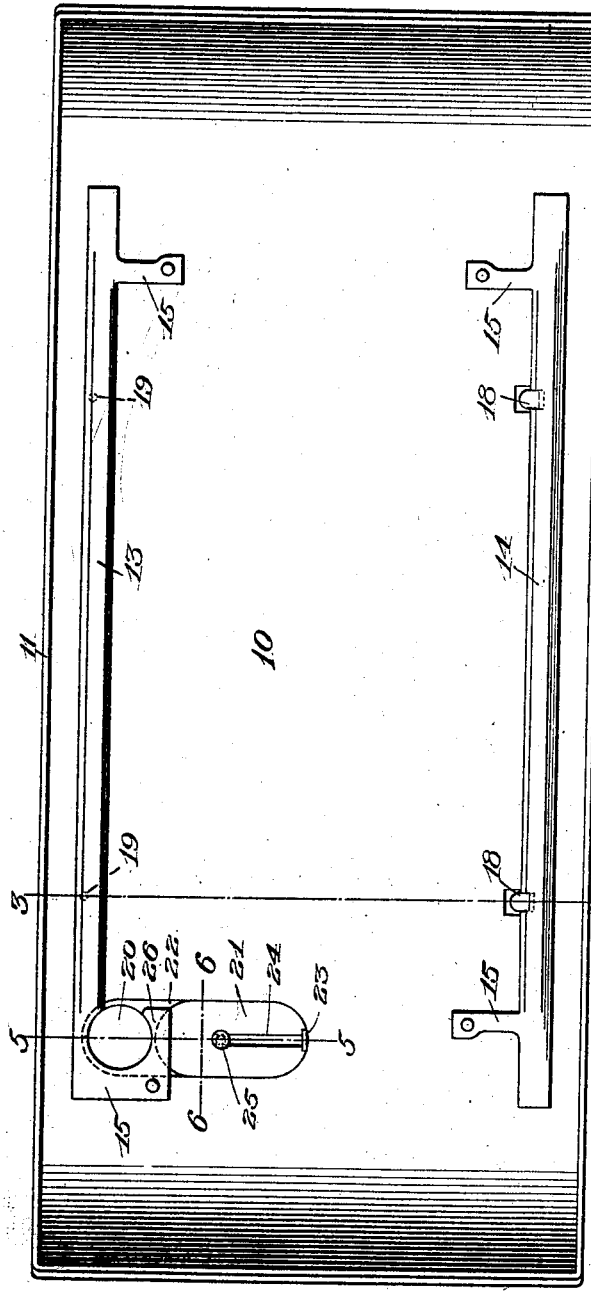
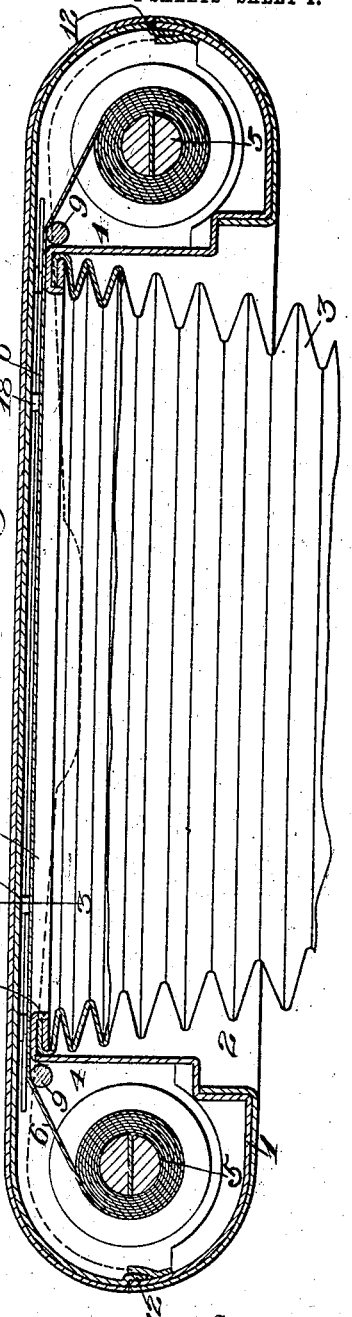

933,470.

Patented Sept. 7, 1909.
2 SHEETS—SHEET 2.

Witnesses
Walter B. Payne
Russell B. Griffith

Inventor
Robert Kroedel
By Church & Rich
his Attorneys

UNITED STATES PATENT OFFICE.

ROBERT KROEDEL, OF ROCHESTER, NEW YORK, ASSIGNOR TO EASTMAN KODAK CO., OF ROCHESTER, NEW YORK, A CORPORATION OF NEW YORK.

CAMERA-BACK.

933,470.  Specification of Letters Patent.  Patented Sept. 7, 1909.

Application filed April 24, 1908. Serial No. 428,953.

*To all whom it may concern:*

Be it known that I, ROBERT KROEDEL, of Rochester, in the county of Monroe and State of New York, have invented certain new and useful Improvements in Camera-Backs; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a back for film cameras which will provide simple, light and efficient means for flattening the film while in position for exposure and causing it to accurately coincide with the focal plane of the lens.

A further object of my invention is to provide, preferably in conjunction therewith, a simple means for retaining a plate in position for exposure whereby the latter may be used, upon occasion, in a film camera without recourse to the more complicated devices usually resorted to for effecting the adaptation.

To these and other ends the invention consists in certain improvements and combinations of parts all as will be hereinafter more fully described, the novel features being pointed out in the claims at the end of the specification.

Figure 3:
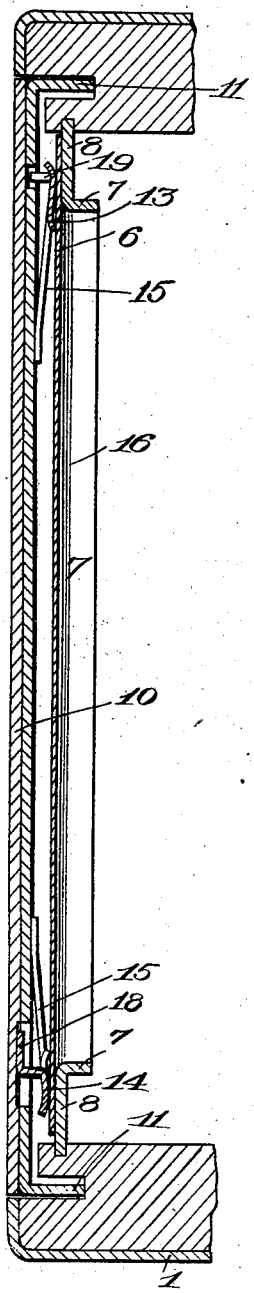
Figure 4:
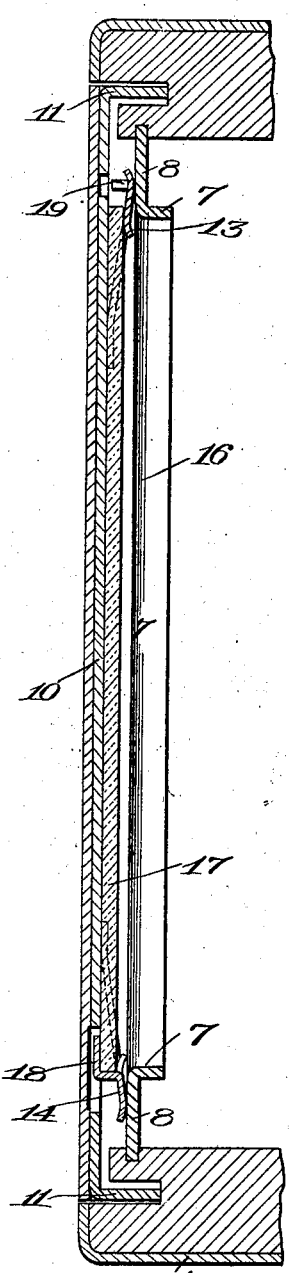
Figure 5:
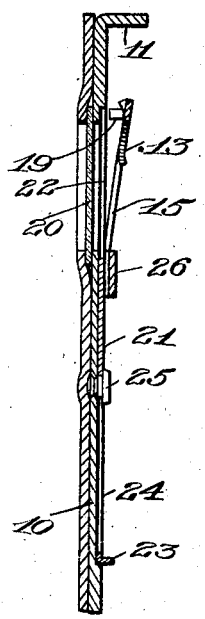
Figure 6:
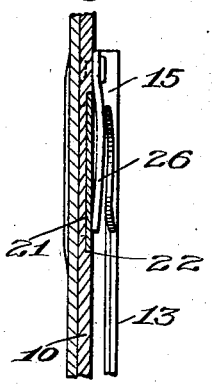

In the drawings: Figure 1 is an elevation of the inner side of a camera back constructed in accordance with and illustrating one embodiment of my invention. Fig. 2 is a horizontal section through a camera to which the back has been applied. Fig. 3 is an enlarged vertical fragmentary section through the rear of the camera and back taken substantially on the line 3—3 of Figs. 1 and 2. Fig. 4 is a similar section but showing a plate instead of film retained by the back in position for exposure. Fig. 5 is an enlarged fragmentary section through the inspection opening and closure therefor taken on line 5—5 of Fig. 1. Fig. 6 is a similar horizontal section taken on the line 6—6 of Fig. 1.

Similar reference numerals in the several figures indicate similar parts.

The camera to which in the present instance. I have shown my invention applied is of the folding, roll holding type comprising a casing 1 having a bellows chamber 2, bellows 3, and film chambers 4 at the sides. Located in the latter are the film spools 5 which support the film 6 and by means of which it is fed past the exposure opening 16 at the rear of the bellows chamber. The exposure opening is, in the present embodiment, defined by a frame 7 at the rear of the camera having portions forming a track 8 for the film as it is fed past the opening over the guide rollers 9 and operating to dispose it in the focal plane of the camera lens.

The back 10 is herein shown composed of double plates so formed and disposed as to provide top and bottom flanges 11 and end flanges 12 that coöperate with reciprocal portions of the camera in a light tight joint, suitable fastening means (not shown) being provided at any convenient point.

As the film when disposed across the exposure opening is apt to buckle slightly particularly at its edges, being in contact with the camera only upon one, its forward side, and thereby cause irregularities in the negative produced because of the sensitized surface not being strictly and at all points in the focal plane of the lens, I provide upon the back 10, means for exerting a yielding pressure upon the rear of the film, preferably at its edges, said means developing sufficient tension to flatten the film against the rear of the camera.

In carrying out this improvement, I provide two parallel strips 13, and 14 preferably of resilient material such as thin spring metal on the inner side of the back which project inwardly coextensive and in normal contact with the film tracks 8. These strips are curved slightly in cross section as shown to provide a rounded contact and supported by means of resilient arms 15, so as to arrange themselves as shown in Fig. 3 in brushing contact with the rear surface of the film sheet 6 (or the black paper backing therefor) and press it to a flat position in which all portions of its extent are in one place and that the focal plane of the lens.

In the event that it is desired to occasionally employ a plate instead of film in the camera, as when the single exposure is to be immediately developed, a plate 17 may be arranged against the back and retained beneath or in rear of the strips 13 and 14 as shown in Fig. 4. To this end I provide, in the present instance, supporting brackets 18 upon the rear or under side of the lower strip 14 formed by angular ears and upon which the lower edge of a plate of suitable size is adapted to rest. The plate is applied by first inserting its upper edge beneath the upper strip 13 as far as limiting stops or abutments 19 and then lowering it until its bottom edge rests upon the brackets 18. The supporting arms 15 of the strips are so arranged as to prevent lateral movement of the plate by engagement with its side edges or to support its weight in case the camera is turned upon its side for exposure for well known purposes. In any case the plate is held in proper register with the exposure opening of the camera and while readily inserted or removed is secure in its position.

The back is provided with the usual inspection opening 20 of colored transparency but as the useless entrance of even non-actinic rays should be prevented at all times and particularly in the present construction where the plate is arranged closely adjacent to the back, I provide the opening with a movable opaque closure 21. The opening is, in the present instance located within a depression 22 on the inner side of the back within which slides a plate 21 having a finger piece 23 and slotted at 24 to receive a guide pin 25. The ends of the plate are preferably rounded to conform to the rounded confines of the depression so as to fit the latter closely when covering the opening, and effectually prevent the entrance of light rays through the latter. As an additional precaution, I provide a spring finger 26 to engage the outer face of the plate and force it tightly against the opening, the said finger being conveniently formed in the present instance from an extension on one side of the supporting arms 15 of the upper strip 13.

A back having the attachments and conveniences described may be constructed at small additional expense and usually without departing from original general forms, yet offer advantages particularly useful to those who do not care for or require a more complicated and expensive structure.

I claim as my invention:

1. The combination with a camera having an exposure opening and means for feeding film across said opening, of a back and means carried thereby for exerting a yielding pressure upon the edges of a film as it is fed across the opening said means being arranged to press the film only at the edges which extend in the direction of movement of the latter.

2. The combination with a camera having a film track at the rear thereof and means for feeding a film along said track, of a back coöperating with the camera and provided on its inner side with an inwardly projecting yielding member adapted to engage a film and flatten it against the track the track and yielding member being arranged to act upon the film only at the edges which extend in the direction of movement thereof.

3. The combination with a camera having a rearward exposure opening and a film track adjacent thereto for guiding the edges of a film fed past the opening, of a back coöperating with the camera and provided on its inner side with an inwardly projecting yielding member adapted to engage the film and flatten it against the track the track and yielding member being arranged to act upon the film only at the edges which extend in the direction of movement thereof.

4. The combination with a camera having a rearward exposure opening and film tracks at the sides thereof, of a back provided on its inner side with parallel yielding strips projecting inwardly toward and extending coincident with the film tracks the strips being disposed upon opposite sides of the opening and adapted to engage a film on the track at the edges only of the latter.

5. The combination with a camera having an exposure opening and means for feeding a continuous strip of film past the latter, of a back provided on its inner side with parallel yielding strips, independently movable and adapted to engage the film sheet only at the opposite edges thereof which extend in the direction of movement of the film.

6. The combination with a camera having an exposure opening and means for feeding a continuous strip of film past the latter, of a back provided on its inner side with parallel yielding strips, independently movable and adapted to engage the film sheet only at the opposite edges thereof which extend in the direction of movement of the film.

7. A camera back provided on its inner face with an inwardly projecting yielding member adapted to engage a film supported at the rear of the camera said member being provided with means for supporting a plate thereon.

8. The combination with a camera back, of an inwardly projecting yielding member arranged on the inner side thereof and adapted to engage a film supported at the rear of the camera, said member being provided with means for engaging one edge of a plate to support the latter thereon, and means for retaining the plate against the back.

9. The combination with a camera back, of a yielding strip carried on the inner side thereof to project inwardly into engagement with the film, said strip being adapted to retain a plate arranged between it and the back.

10. The combination with a camera back, of parallel yielding strips arranged on the inner side thereof to project inwardly into engagement with the film, said strips being adapted to retain a plate arranged between them and the back, and means on one of them for supporting said plate.

11. The combination with a camera back, of a strip or member carried on the inner side thereof to project inwardly into engagement with the film and having resilient supporting arms forming abutments to prevent lateral movement of a plate supported by said member against the back.

12. The combination with a camera back of a yielding strip carried on the inner side thereof to project inwardly into engagement with the film, said strip being provided on the side adjacent the back with a bracket for supporting a plate arranged between the back and strip.

13. The combination with a camera back having an inspection opening therein, of a movable opaque closure for said opening arranged on the inner side of the backing.

14. The combination with a camera back having a depression therein and an inspection opening arranged within the depression, of an opaque closure for the opening movable within the depression.

15. The combination with a camera back having an inspection opening therein, of a movable opaque closure for said opening and means engaging the closure to press it against the opening.

16. The combination with a camera back having an inspection opening therein, and provided on its inner side with an inwardly projecting yielding strip adapted to engage a film sheet at the rear of the camera, of a sliding opaque closure for the opening and a resilient extension on the strip engaging the closure to press the same against the opening.

ROBERT KROEDEL.

Witnesses:
 RUSSELL B. GRIFFITH,
 HAROLD H. SIMMS.